(12) United States Patent
Funakoshi et al.

(10) Patent No.: US 11,906,534 B2
(45) Date of Patent: Feb. 20, 2024

(54) AUTOMATIC ANALYZER

(71) Applicant: HITACHI HIGH-TECH CORPORATION, Tokyo (JP)

(72) Inventors: Sunao Funakoshi, Tokyo (JP); Takenori Okusa, Tokyo (JP); Nobuyuki Isoshima, Tokyo (JP); Koki Yokoyama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 583 days.

(21) Appl. No.: 17/265,289

(22) PCT Filed: Jun. 24, 2019

(86) PCT No.: PCT/JP2019/024952
§ 371 (c)(1),
(2) Date: Feb. 2, 2021

(87) PCT Pub. No.: WO2020/054172
PCT Pub. Date: Mar. 19, 2020

(65) Prior Publication Data
US 2021/0302457 A1    Sep. 30, 2021

(30) Foreign Application Priority Data
Sep. 10, 2018 (JP) .................. 2018-168588

(51) Int. Cl.
*G01N 35/10* (2006.01)
*G01N 35/00* (2006.01)

(52) U.S. Cl.
CPC ............ *G01N 35/1002* (2013.01); *G01N 2035/00346* (2013.01)

(58) Field of Classification Search
CPC ............. G01N 35/1002; G01N 2035/00346
See application file for complete search history.

(56) References Cited

U.S. PATENT DOCUMENTS 9,835,612 B2    12/2017    Makino et al.
2012/0258542 A1    10/2012    Kathe et al.
(Continued)

FOREIGN PATENT DOCUMENTS

AU        654995 B2       12/1994
JP        63-205567 A     8/1988
(Continued)

OTHER PUBLICATIONS

Chinese Office Action received in corresponding Chinese Application No. 201980049599.9 dated Aug. 29, 2023.
(Continued)

*Primary Examiner* — Jill A Warden
*Assistant Examiner* — Michael Stanley Gzybowski
(74) *Attorney, Agent, or Firm* — Mattingly & Malur, PC

(57) ABSTRACT

Provided is an automated analyzer comprising a temperature regulator that can be made more compact in size while maintaining high-precision temperature regulation. In a temperature-regulating unit (20) of the automated analyzer, a first chemical reservoir (1) is constituted by a large-diameter spiral-shaped pipe, and a second chemical reservoir (2) is constituted by a large-diameter chemical reservoir container. The first chemical reservoir (1), which is positioned upstream of the second chemical reservoir (2), has an internal capacity that is set so as to be greater than the volume of a single discharge of each of syringe pumps (29, 30, 31), and the second chemical reservoir (2) also has an internal capacity (volume) that is set so as to be greater than the volume of a single discharge of each of the respective syringe pumps (29, 30, 31).

13 Claims, 6 Drawing Sheets

(56) References Cited

U.S. PATENT DOCUMENTS

2015/0316532 A1 11/2015 Makino et al.
2018/0074043 A1 3/2018 Makino et al.

FOREIGN PATENT DOCUMENTS

JP 2017-26469 A 2/2017
WO 2014/103744 A1 7/2014
WO 2018/047545 A1 3/2018

OTHER PUBLICATIONS

International Preliminary Report on Patentability received in corresponding International Application 'lo. PCT/JP2019/024952 dated Mar. 11, 2021.
International Search Report of PCT/JP2019/024952 dated Juy 16, 2019.
Extended European Search Report received in corresponding European Application No. 19858729.7 dated Mar. 9, 2022.

AUTOMATIC ANALYZER

TECHNICAL FIELD

The present invention relates to an automatic analyzer that adjusts the temperature of a reagent used in an analysis.

BACKGROUND ART

An automatic analyzer is a device that performs an analysis by dispensing a sample solution containing an analysis target substance and a reaction reagent into a reaction container and causing the sample solution and the reaction reagent to react with each other, and optically measuring the reaction solution.

For example, there is an automatic analyzer for detecting specific biological components, chemical substances, and the like, which are contained in a sample when blood, serum, urine, or the like are used as the sample. In order to obtain sufficient analysis accuracy in the automatic analyzer, it is necessary to maintain the temperature of a reagent used in the pre-treatment of a sample or the temperature of a reagent used in an analysis to be constant.

As a method of controlling the temperature of the reagent, as disclosed in PTL 1, a method of performing cooling using cooling water produced by a Peltier element and a constant temperature water tank or a method of performing cooling using a Peltier element and an air-cooled heat dissipation fin is known.

In addition, as a structure of a flow path of a device that adjusts the temperature of a reagent, a structure of heating a meandering flow path is known as disclosed in PTL 2.

CITATION LIST

Patent Literature

PTL 1: JP 2017-26469 A
PTL 2: WO2014/103744

SUMMARY OF INVENTION

Technical Problem

In the automatic analyzer, it is preferable that the installation area of the device is small. In order to reduce the size of the device, it is desired to reduce the size of a temperature adjusting device that adjusts the temperature of the reagent, which is a component of the device.

In the conventional temperature adjusting device, a method using a constant temperature water tank and a heater is often used, and there is a problem that the size becomes large for automatic analysis and size reduction has difficulty.

Further, although the Peltier element is used in some cases as in PTL 1, a meandering flow path is used as the flow path, as in PTL 2. Thus, more size reduction has difficulty.

It is necessary not to simply reduce the size of the temperature adjusting device, but to reduce the size while maintaining temperature adjustment with high precision.

However, in the prior art, it has been difficult to realize an automatic analyzer including a temperature adjusting device capable of further reducing the size while maintaining temperature adjustment with high precision.

An object of the present invention is to realize an automatic analyzer including a temperature adjusting device capable of reducing a size while maintaining temperature adjustment with high precision.

Solution to Problem

In order to achieve the above object, the present invention is configured as follows.

An automatic analyzer includes an analyzing unit that analyzes a sample and a temperature adjusting unit that adjusts a temperature of a reagent required to analyze the sample in advance and supplies the reagent to the analyzing unit. The temperature adjusting unit includes a first reagent storage portion that has a first reagent storage volume and stores a reagent, and a second reagent storage portion that has a second reagent storage volume and is connected to the first reagent storage portion, the second reagent storage portion being supplied with a reagent from the first reagent storage portion.

Advantageous Effects of Invention

It is possible to realize an automatic analyzer including a temperature adjusting device capable of reducing a size while maintaining temperature adjustment with high precision.

DESCRIPTION OF EMBODIMENTS

Hereinafter, embodiments of the present invention will be described with reference to the accompanying drawings.

The following examples are examples when the present invention is applied to an automatic immunoassay analyzer.

EMBODIMENTS

Embodiment 1

Figure 1:
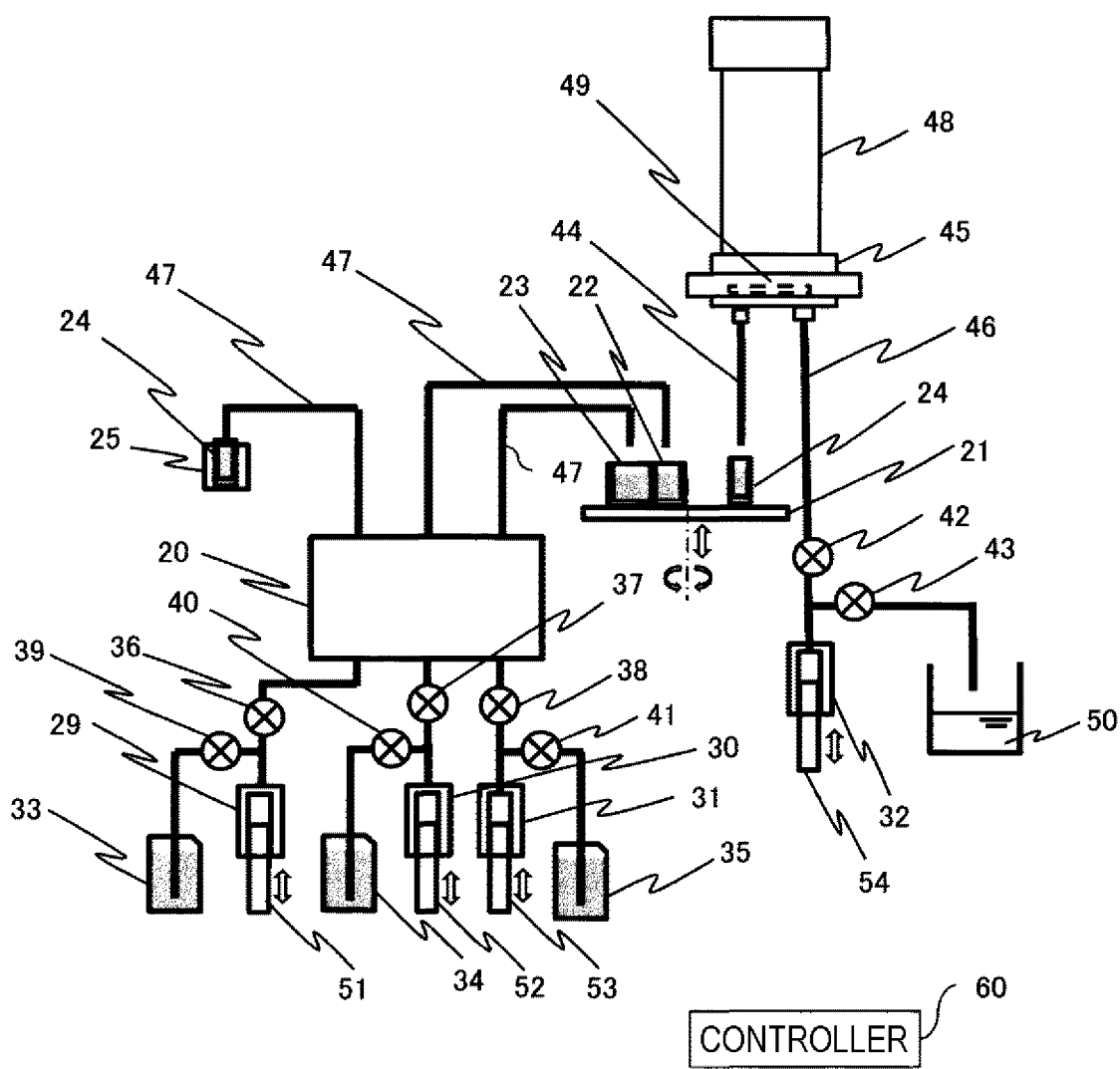
FIG. 1 is a diagram illustrating an overall configuration of an automatic immunoassay analyzer according to Embodiment 1 of the present invention.

FIG. 1 is a diagram illustrating an overall configuration of an automatic immunoassay analyzer according to Embodiment 1 of the present invention.

In FIG. 1, reagents required for analyzing a sample are stored in reagent storage portions 33 to 35, respectively. When the reagent (buffer solution) of the reagent storage portion 33 is delivered, a valve 39 is opened, and a valve 36 is closed. Then, a plunger 51 of a syringe pump (delivery unit that intermittently delivers the reagent) 29 is moved in a sucking direction (downward direction in FIG. 1) to suck the reagent from the reagent storage portion 33.

Then, the valve 39 is closed, and the valve 36 is opened. The plunger 51 is moved in a discharge direction (upward direction in the figure) to discharge the reagent, and thus the reagent is delivered to a sample container 24 containing a sample in a reagent pre-treatment unit 25 via a tube 47.

The sample container on which a treatment has been completed by the reagent pre-treatment unit 25 is transported to a container holding member 21 by a transport mechanism (not illustrated) and is held.

Regarding the reagent (for example, reaction auxiliary liquid) in the reagent storage portion 34, a valve 40 is opened, a valve 37 is closed, and then a plunger 52 of a syringe pump 30 is moved in the sucking direction to suck the reagent from the reagent storage portion 34.

Then, the valve 40 is closed, the valve 37 is opened, and the plunger 52 is moved in the discharge direction to discharge the reagent. In this manner, the reagent is delivered to a reagent container 22 held by the container holding member 21 via a tube 47.

Regarding the reagent (for example, cleaning liquid) in the reagent storage portion 35, a valve 41 is opened, a valve 38 is closed, and then a plunger 53 of a syringe pump 31 is moved in the sucking direction to suck the reagent from the reagent storage portion 35.

Then, the valve 41 is closed, the valve 38 is opened, and the plunger 53 is moved in the discharge direction to discharge the reagent. In this manner, the reagent is delivered to a sample container 23 held by the container holding member 21 via a tube 47.

The reagents in the reagent containers 22 and 23 fixed to the container holding member 21 and the sample in the sample container 24 are delivered to a detector 49 in accordance with a predetermined sequence. The container holding member 21 performs two operations of rotation and vertical movement. When the sample or the reagent is delivered to the detector 49, the container holding member 21 is rotated so that a nozzle 44 is located above the container of which the reagent or the sample is to be delivered. Then, the container holding member 21 is raised so that the tip portion of the nozzle 44 is put into the reagent. In that state, a valve 42 is opened, a valve 43 is closed, and a plunger 54 of a syringe pump 32 is moved in the suction direction. Then, the sample or the reagent is sucked through a pipe 46 and guided to the detector 49.

After that, the valve 42 is closed, the valve 43 is opened, and the plunger 54 is moved in the discharge direction so that the sample or the reagent is discharged to a waste liquid container 50. Then, the container holding member 21 is lowered, and the container holding member 21 is rotated so that the nozzle 44 for the reagent or the sample to be delivered next is located above the container of which the reagent or the sample is to be delivered.

Subsequently, after the same operation is repeated and the measurement of one sample is completed, the measurement proceeds to the next sample.

The detector 49 is fixed to a detector (analysis unit that analyzes the sample) 48 via a holding portion 45. The detector 48 analyzes the components detected by the detector 49.

When the reagents stored in the reagent storage portions 33, 34, and 35 are delivered to the reagent pre-treatment unit 25 or the reagent containers 22 and 23, the temperatures of the reagents are adjusted in advance in a temperature adjusting unit 20. The temperature adjusting unit 20 is a device for adjusting the temperature of the reagent supplied to the detector (analysis unit that analyzes the sample) 48.

In addition, a space in which the sample container 24 and the reagent containers 22 and 23 are installed and the temperature of the detector 49 are controlled by respective temperature adjusting means (not illustrated).

Further, the operations of the plungers 51 to 54, the valves 36 to 43, the reagent pre-treatment unit 25, the container holding member 21, and the detector 48 are controlled by a controller 60.

Next, the structure of the temperature adjusting unit 20 in one embodiment of the present invention will be described.

Figure 2A:
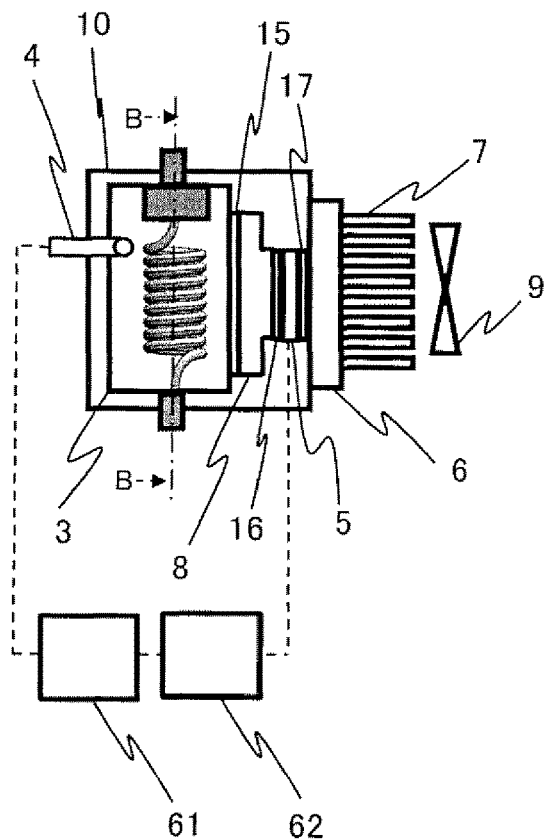
FIG. 2A is a schematic cross-sectional view illustrating a temperature adjusting unit of the automatic analyzer according to Embodiment 1 of the present invention.
Figure 2B:
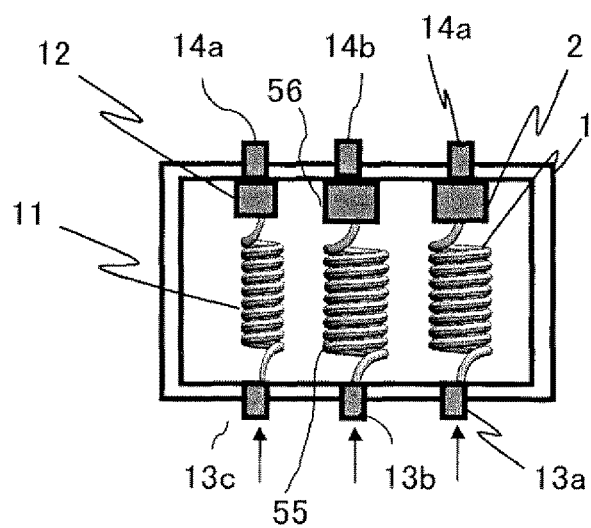
FIG. 2B is a cross-sectional view taken along line B-B of FIG. 2A.

FIG. 2A is a schematic cross-sectional view illustrating a temperature adjusting unit 20 of the automatic analyzer according to Embodiment 1 of the present invention. FIG. 2B is a cross-sectional view taken along line B-B of FIG. 2A.

However, a first reagent storage portion 1, a third reagent storage portion 11, and a fifth reagent storage portion 55 are not illustrated in cross section for convenience of illustration.

In FIGS. 2A and 2B, the first reagent storage portion 1 and a second reagent storage portion 2 are attached to a metal block 3 made of aluminum or the like. The first reagent storage portion 1 is obtained by spirally shaping a pipe made of stainless steel or the like to store the reagent. The second reagent storage portion 2 functions as a buffer portion formed by a slightly thick straight stainless steel pipe or the like and stores the reagent. The reagent is supplied from the first reagent storage portion 1 to the second reagent storage portion 2. In addition, a third reagent storage portion 11 and a fourth reagent storage portion 12 are attached. The third reagent storage portion 11 is obtained by spirally shaping a pipe made of stainless steel or the like to store the reagent. The fourth reagent storage portion 12 functions as a buffer portion formed by a slightly thick straight stainless steel pipe or the like and stores the reagent. Further, the fifth reagent storage portion 55 and a sixth reagent storage portion 56 are attached. The fifth reagent storage portion 55 is obtained by spirally shaping a pipe made of stainless steel or the like to store the reagent. The sixth reagent storage portion 56 functions as a buffer portion formed by a slightly thick straight stainless steel pipe or the like and stores the reagent.

As a method of attaching the first reagent storage portion 1 and the second reagent storage portion 2 to the metal block 3, a through hole which is slightly larger than the outer shape of the spiral of the pipe of the first reagent storage portion 1 is provided in the metal block 3. The first reagent storage portion 1 and the second reagent storage portion 2 are inserted into the through hole and are fixed by pouring solder or the like around the through hole.

The first reagent storage portion 1 may be inserted into a through hole formed in the metal block 3 in a state where a pipe is wound around an aluminum cylinder, and be fixed with solder. A tube connector 13a is attached to the inlet port of the pipe of the first reagent storage portion 1. The tube connector 13a is threaded to be connected to the tube 47 with a fitting for the tube.

Further, a tube connector 14a is attached to the outlet port of the second reagent storage portion 2. The tube connector 14a is threaded to be connected to the tube 47 with a fitting for the tube.

The third reagent storage portion 11, the fourth reagent storage portion 12, the fifth reagent storage portion 55, and the sixth reagent storage portion 56 are attached to the metal block 3 in a manner similar to the first reagent storage portion 1 and the second reagent storage portion 2.

In addition, tube connectors 13b and 13c similar to the tube connector 13a are attached to the inlet ports of the pipes of the third reagent storage portion 11 and the fifth reagent storage portion 55, and thus are connected to the tube 47.

Further, tube connectors 14b and 14c similar to the tube connector 13a are attached to the outlet ports of the pipes of the fourth reagent storage portion 12 and the sixth reagent storage portion 56, and thus are connected to the tube 47.

A heat diffusion plate 8 made of aluminum or the like is connected to the metal block 3 via a thermal interface 15 such as grease, and a Peltier element 5 is further connected to the metal block 3 via a thermal interface 16. A heat sink configured by a fin base 6 and a fin 7 is connected to the opposite surface of the Peltier element 5 via a thermal interface 17. Then, a fan 9 is connected to the fin 7.

The metal base 3 is surrounded by a heat insulator 10. The heat insulator 10 is formed of, for example, urethane foam or the like.

The Peltier element 5 and the thermal interfaces 16 and 17 are fixed by a method of, for example, sandwiching the Peltier element 5 and the thermal interfaces 16 and 17 between the heat diffusion plate 8 and the fin base 6 and fixing the Peltier element 5 and the thermal interfaces 16 and 17 with screws.

In addition, the thermal interface 15 is fixed by a method of sandwiching the thermal interface 15 between the metal block 3 and the heat diffusion plate 8 and fixing the thermal interface 15 with screws.

A temperature detection unit of a temperature detector 4 is disposed in the vicinity of the reagent outlet port of the first reagent storage portion 1. The temperature detector 4 is supported by the metal block 3. The temperature detected by the temperature detector 4 is output to a Peltier element controller 61. The output from the Peltier element controller 61 is supplied to a power output unit 62, and the power is supplied from the power output unit 62 to the Peltier element 5.

Figure 3A:
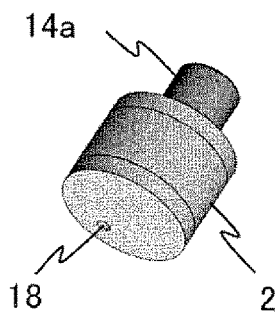
FIG. 3A is a perspective view illustrating the external appearance of a second reagent storage portion.
Figure 3B:
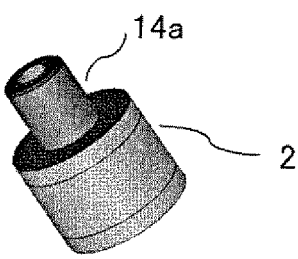
FIG. 3B is a perspective view illustrating the external appearance of the second reagent storage portion.

FIGS. 3A and 3B are perspective views illustrating the external appearance of the second reagent storage portion 2. In FIGS. 3A and 3B, a hole 18 for attaching the pipe-shaped first reagent storage portion 1 is formed on a surface of the second reagent storage portion, which is opposite to a surface on which the tube connector 14a is formed.

Next, the operation of the temperature adjusting unit 20 will be described.

Here, description will be made on the assumption that all the thermal interfaces 15, 16, and 17 are thermal grease.

In a cooling operation in which the ambient temperature is high and the chemical solution is cooled, power is supplied from the power output unit 62 to the Peltier element 5 so that the surface of the Peltier element 5 on the metal block 3 side is at a low temperature and the surface on the fin base 6 side is at a high temperature. The heat of the reagent moving or staying in the first reagent storage portion 1 or the second reagent storage portion 2 is absorbed by the Peltier element 5 through the metal block 3, the grease 15, the heat diffusion plate 8, and the grease 16.

Heat is emitted (radiated) from the surface of the Peltier element 5, which is opposite to the grease 16 side. The heat is transferred from the grease 17 and the fin base 6 to the fins 7 and radiated to the air flowing between the fins 7 by the fan 9.

In a heating operation in which the ambient temperature is low and the chemical solution is heated, power is supplied from the power output unit 62 to the Peltier element 5 so that the surface of the Peltier element 5 on the metal block 3 side is at a high temperature and the fin base 6 side is at a low temperature. In the heating operation, the temperature of the fin 7 is lower than the air temperature. Thus, heat is taken from the air flowing between the fins 7 by the fan 9, and is absorbed by the Peltier element 5 through the fin base 6 and the grease 17. Heat is emitted (radiated) from the surface of the Peltier element 5 on the grease 16 (being the thermal interface) side. The heat is applied to the reagent that moves or stays in the first reagent storage portion 1 or the second reagent storage portion 2, through the grease 16, the heat diffusion plate 8, the grease 15, and the metal block 3.

A target temperature is set in the Peltier element controller 61. The Peltier element controller controls a current (power) output from the current output unit 62 to the Peltier element 5 based on the target temperature and the temperature detected by the temperature detector 4, so that the reagents stored in the first reagent storage portion 1, the second reagent storage portion 2, the third reagent storage portion 11, the fourth reagent storage portion 12, the fifth reagent storage portion 55, and the sixth reagent storage portion 56 have the target temperature.

As a method of controlling the current output of the Peltier element controller 61, for example, a method of controlling the on/off time ratio of the current, that is, the duty ratio, is performed based on the target temperature and the temperature detected by the temperature detector 4 at regular time intervals, by proportional-integration-differential control (PID control) at regular time intervals. At this time, the current in supplying the power is set to be constant.

Here, the reason that the temperature adjusting unit 20 in Embodiment 1 of the present invention is smaller than a temperature adjusting unit having a structure different from that of the present invention, but can more stably control the reagent temperature at the outlet port of the temperature adjusting unit 20 will be described.

Figure 4:
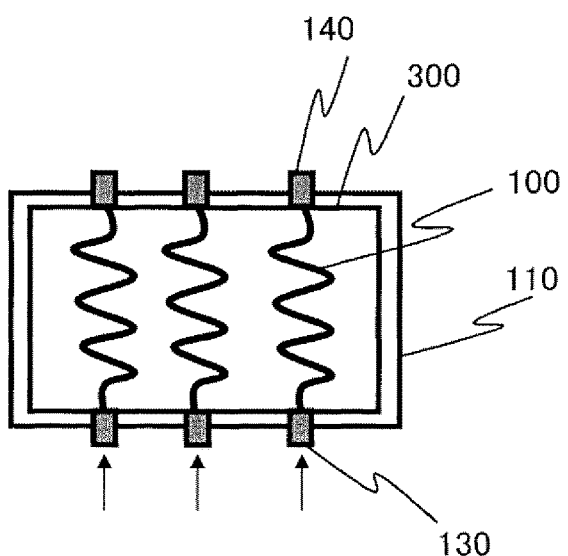
FIG. 4 is a schematic diagram illustrating a structure of a temperature adjusting unit that is different from that according to the present invention.

FIG. 4 is a schematic diagram illustrating the structure of the temperature adjusting unit that is different from that according to the present invention.

In FIG. 4, in a structure of an example different from the present invention, a first reagent storage portion 100 configured by a meandering pipe is buried in a metal block 300, and tube connectors 130 and 140 are attached to both ends of the first reagent storage portion 100. In addition, another reagent storage portion similar to the first reagent storage portion 100 is formed. The periphery of the metal block 300 is insulated by a heat insulator 110.

In the structure of the example different from the present invention, the tube connector 140 is formed, but is connected to the outlet portion of the first reagent storage portion 100. A second reagent storage portion to which the reagent is supplied from the first reagent storage portion 100 is not formed. Similarly, for other reagent storage portions, no second reagent storage portion is formed.

Figure 5A:
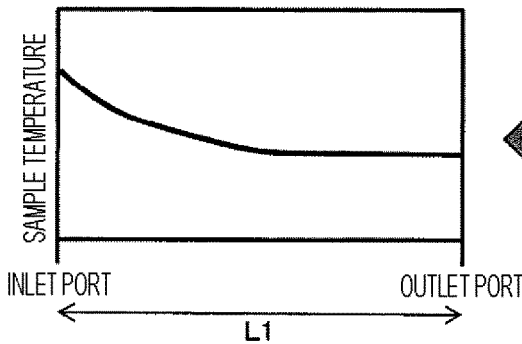
FIG. 5A is a diagram illustrating a temperature distribution of a reagent in a temperature adjusting unit having a structure of an example that is different from that according to the present invention illustrated in FIG. 4.
Figure 5A:
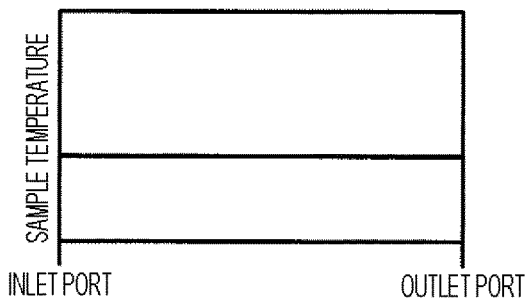
Figure 5B:
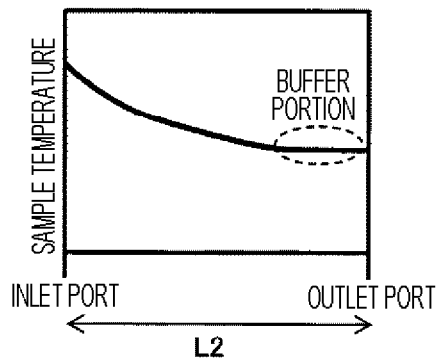
FIG. 5B is a diagram illustrating a temperature distribution of a reagent in the temperature adjusting unit according to Embodiment 1 of the present invention.
Figure 5B:
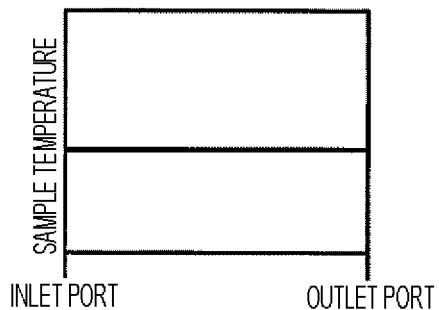

FIG. 5A is a diagram illustrating a temperature distribution of the reagent in a temperature adjusting unit having a structure of the example different from that according to the present invention illustrated in FIG. 4. FIG. 5B is a diagram illustrating a temperature distribution of the reagent in the temperature adjusting unit 20 according to Embodiment 1 of the present invention. FIGS. 5A and 5B illustrate an example of the cooling operation in which the ambient temperature is high.

In FIGS. 5A and 5B, the graph on the left side represents the reagent temperature distribution immediately after the operation of the syringe pump that supplies the reagent to the temperature adjusting unit is completed. The graph on the right side represents the temperature distribution immediately before the operation of the syringe pump is started. In each of the graphs, the horizontal axis indicates the linear distance from the inlet port of the temperature adjusting unit, and the vertical axis indicates the temperature of the reagent.

Here, in FIG. 1, the operations of the syringe pumps 29, 30, and 31 are intermittently performed. For example, the syringe pumps operate once every 30 seconds, and the operation time is as short as about one second to several seconds. When the syringe pumps 29, 30, and 31 do not operate, the reagents in the temperature adjusting unit 20 are stationary.

In FIG. 5A which illustrates the liquid temperature distribution in the structure of the example different from that according to the present invention, the internal volume of the pipe is larger than the amount of liquid delivered at one time. The temperature is high until reaching of the reagent from the inlet port in one operation of the syringe pump. The reagent is cooled more as the reagent flows to downstream (outlet port), and the temperature becomes lower. The temperature on the downstream of a place where the reagent added from the inlet port in one operation of the syringe pump reaches the already-stored reagent portion does not change. Then, the reagent is cooled while the syringe pump is stopped, and thus the entirety of the reagent is settled to a substantially uniform temperature as represented in the graph on the right side in FIG. 5A.

In the structure according to Embodiment 1 of the present invention, which is illustrated in FIG. 2, the internal volume (first reagent storage volume) of the first reagent storage portion 1 located on the upstream side of the second reagent storage portion 2 is set to be larger than the one-time discharge amount of each of the syringe pumps 29, 30, and 31.

Further, the internal volume (second reagent storage volume) of the second reagent storage portion 2 on the downstream side is also set to be larger than the one-time discharge amount of each of the syringe pumps 29, 30, and 31.

Since the second reagent storage portion 2 is configured by a pipe thicker than the first reagent storage portion 1, a large internal volume can be obtained even with the same length. However, as illustrated in FIG. 5B, the temperature of the reagent in the second reagent storage portion 2 (buffer portion) on the downstream can be set to constant. Thus, the temperature of the reagent leaving from the temperature adjusting unit 20 is controlled in the similar manner as in the example illustrated in FIG. 5A.

Meanwhile, in a case where the ambient temperature of the automatic immunoassay analyzer changes rapidly, the heat capacity of the reagent in the second reagent storage portion 2 in Embodiment 1 of the present invention is large and the temperature does not change easily. Thus, even though the outer shape is smaller than that in the structure of the example different from that in the present invention illustrated in FIG. 4, it is possible to more stably control the temperature of the reagent discharged from the temperature adjusting unit 20.

That is, a distance L2 from the inlet port to the outlet port of the temperature adjusting unit 20 according to Embodiment 1 of the present invention is set to be shorter than a distance L1 from the inlet port to the outlet port of the temperature adjusting unit having a structure different from that of the present invention, and thus, even with the structure of the small outer shape, it is possible to more stably control the temperature of the reagent discharged from the temperature adjusting unit 20.

When the amount of liquid to be delivered differs depending on the flow path, for example, when the amount of liquid to be delivered to the reagent pre-treatment unit 25 in FIG. 1 is smaller than that in other flow paths, as illustrated in FIG. 2B, the winding diameter of the spiral pipe of the third reagent storage portion 11 corresponding to the flow path may be set to be smaller than that of the first reagent storage portion 1 and the fifth reagent storage portion 55, so as to reduce the reagent storage volume in comparison to the first reagent storage portion 1 and the fifth reagent storage portion 55. The inner diameter of the pipe of the fourth reagent storage portion 12 may be set to reduce the reagent storage volume in comparison to the second reagent storage portion 2 and the sixth reagent storage portion 56. Alternatively, the same one as the first reagent storage portion 1 and the fifth reagent storage portion 55 may be used as the third reagent storage portion 11, and thus only the reagent storage volume of the fourth reagent storage portion 12 may be reduced in comparison to the second reagent storage portion 2 and the sixth reagent storage portion 56.

It is possible to further reduce the size of the temperature adjusting unit 20 without impairing the temperature controllability, by changing the internal volume of the reagent storage portion in accordance with the amount of the reagent to be delivered in this manner.

As described above, according to Embodiment 1 of the present invention, a spiral pipe having a large diameter is used as the first reagent storage portion 1, and reagent storage container having a large diameter is used as the second reagent storage portion 2. The internal volume of the first reagent storage portion 1 located on the upstream side of the second reagent storage portion 2 is set to be larger than the one-time discharge amount of each of the syringe pumps 29, 30 and 31. The internal volume of the second reagent storage portion 2 is also set to be larger than the one-time discharge amount of each of the syringe pumps 29, 30 and 31. Accordingly, it is possible to realize an automatic analyzer including a temperature adjusting device capable of reducing a size while maintaining temperature adjustment with high precision.

Note that, the third reagent storage portion 11 (having a third reagent storage volume), the fourth reagent storage portion 12 (having a fourth reagent storage volume), the fifth reagent storage portion 55 (having a fifth reagent storage volume), and the sixth reagent storage portion 56 (having a sixth reagent storage volume) have the same structure as the first reagent storage portion 1 and the second reagent storage portion 2. However, regarding the diameter of the pipe and the dimensions of the reagent storage container, the first reagent storage portion 1 and the second reagent storage portion 2 may be different from each other or be the same as each other, the third reagent storage portion 11 and the fourth reagent storage portion 12 may be different from each other or be the same as each other, and the fifth reagent storage portion 55 and the sixth reagent storage portion 56 may be different from each other or be the same as each other.

Embodiment 2

Next, Embodiment 2 of the present invention will be described.

Figure 6:
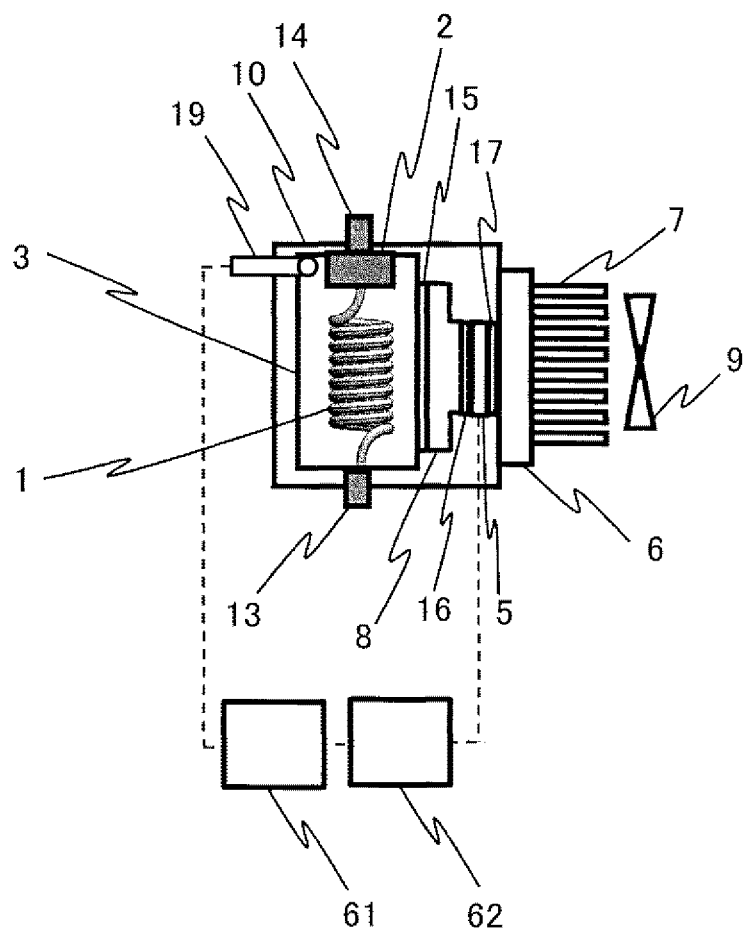
FIG. 6 is a diagram illustrating a structure of a temperature adjusting unit according to Embodiment 2 of the present invention.

FIG. 6 is a diagram illustrating a structure of a temperature adjusting unit 20 according to Embodiment 2 of the present invention. In FIG. 6, components common with those in Embodiment 1 described above are denoted by the same reference signs. In addition, the configuration of the applied automatic immunoassay analyzer is similar to the example illustrated in FIG. 1, and thus illustrations and detailed description will be omitted.

In FIG. 6, the temperature detection unit of the temperature detector 4 is disposed in the vicinity of the reagent outlet port of the first reagent storage portion 1, in Embodiment 1. However, in Embodiment 2, a temperature detection unit of a temperature detector 19 is disposed in the vicinity of the reagent outlet port of the second reagent storage portion 2. Other components are similar to those in Embodiment 1.

According to Embodiment 2, it is possible to obtain effects similar to those in Embodiment 1. In addition, when the load fluctuation such as the temperature fluctuation around the automatic immunoassay analyzer is small, the temperature detector is provided in the vicinity of the outlet port of the second reagent storage portion 2, which is close to the outlet port of the temperature adjusting unit 20 as in Embodiment 2, and thereby it is possible to precisely control the temperature of the reagent.

Embodiment 3

Next, Embodiment 3 of the present invention will be described.

Figure 7:
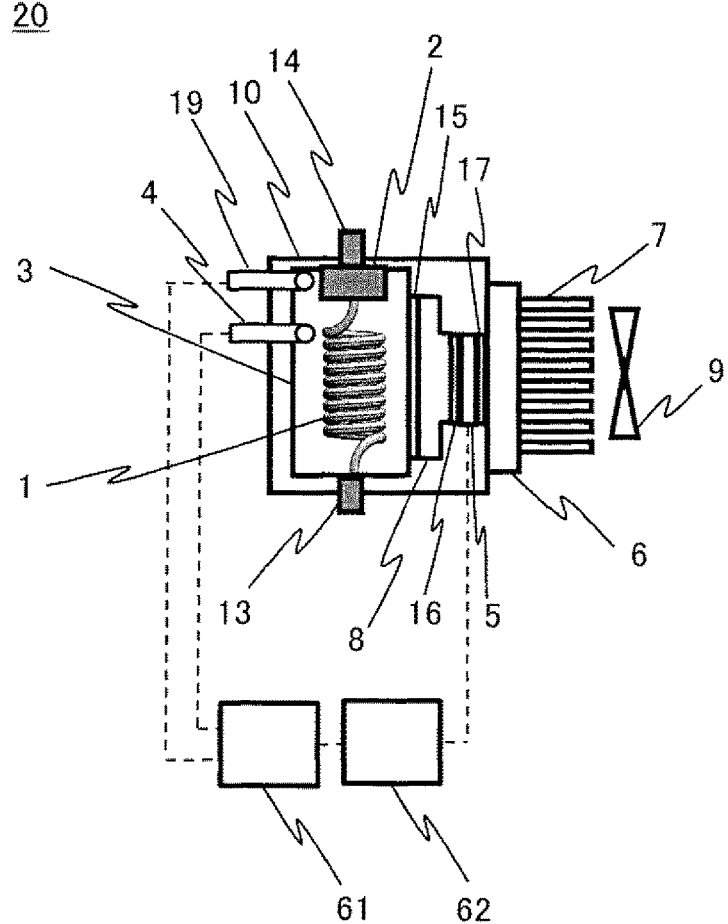
FIG. 7 is a diagram illustrating a structure of a temperature adjusting unit according to Embodiment 3 of the present invention.

FIG. 7 is a diagram illustrating a structure of a temperature adjusting unit 20 according to Embodiment 3 of the present invention. In FIG. 7, components common with those in Embodiments 1 and 2 described above are denoted by the same reference signs. In addition, the configuration of the applied automatic immunoassay analyzer is similar to the example illustrated in FIG. 1, and thus illustrations and detailed description will be omitted.

In FIG. 7, in Embodiment 3, a first temperature detector 4 is provided in the vicinity of the outlet port of the first reagent storage portion 1, and a second temperature detector 19 is provided in the vicinity of the outlet port of the second reagent storage portion 2.

Since the first reagent storage portion 1 has a relatively favorable followability to the output change of the Peltier element 5, for example, when a rapid change in the ambient temperature occurs around the temperature adjuster 20, in a case where quick feedback is required, the Peltier element controller 61 controls the Peltier element 5 by the second temperature detector 19 and the target temperature.

When the temperature fluctuation is small under normal operating conditions (when rapid ambient temperature fluctuation does not occur around the temperature adjuster 20), the Peltier element controller 61 controls the Peltier element by the first temperature detector 4 and the target temperature.

Regarding the determination of which of the first temperature detector 4 and the second temperature detector 19 performs the control, a threshold value based on the amount of change in temperature per unit time by the second temperature detector 19 is set in the Peltier element controller 61.

According to the third embodiment, it is possible to obtain effects similar to those in Embodiments 1 and 2. In addition, it is possible to control an outlet reagent temperature of the temperature adjusting unit 20 by following even the rapid load fluctuation. When the load fluctuation is small, it is possible to precisely control the reagent temperature.

Embodiment 4

Next, Embodiment 4 of the present invention will be described.

Figure 8:
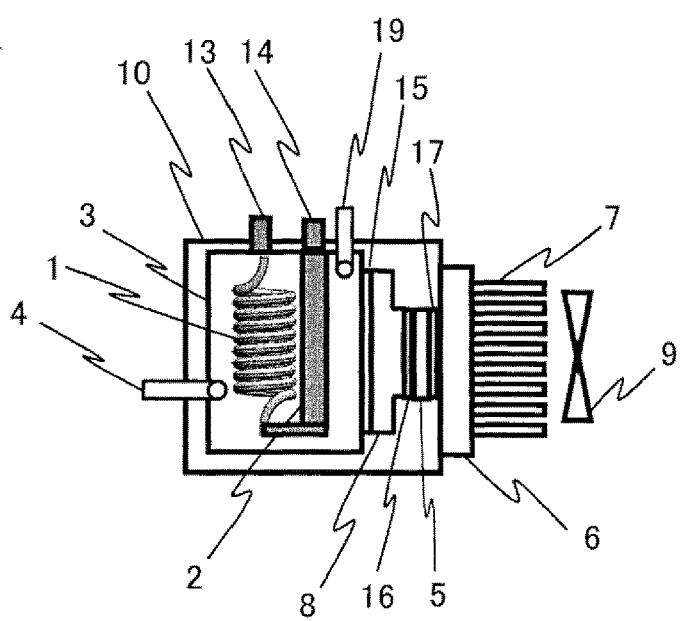
FIG. 8 is a diagram illustrating a structure of a temperature adjusting unit according to Embodiment 4 of the present invention.

FIG. 8 is a diagram illustrating a structure of a temperature adjusting unit 20 according to Embodiment 4 of the present invention. In FIG. 8, components common with those in Embodiment 1 described above are denoted by the same reference signs. In addition, the configuration of the applied automatic immunoassay analyzer is similar to the example illustrated in FIG. 1, and thus illustrations and detailed description will be omitted.

In Embodiment 1, the temperature detection unit of the temperature detector 4 is disposed in the vicinity of the reagent outlet port of the first reagent storage portion 1. However, in FIG. 8, in Embodiment 4, the shape of the second reagent storage portion 2 is set to be a relatively elongated rectangular shape, and is disposed at a position closer to the Peltier element 5 than the first reagent storage portion 1.

In addition, the temperature detector 4 and the temperature detector 19 are disposed in the vicinity of the outlet ports of the first reagent storage portion 1 and the second reagent storage portion 2.

In Embodiment 4, it is possible to obtain effects similar to those in Embodiment 1. In addition, since the outlet port of the second reagent storage portion 2 is disposed at the position close to the Peltier element 5, a response of the reagent temperature change to the output change of the Peltier element 5 becomes faster, and it is possible to further improve the temperature control accuracy.

Note that, in Embodiment 4, as in Embodiment 1 or 2, the temperature detector may also be disposed in either the vicinity of the outlet port of the first reagent storage portion 1 or the vicinity of the outlet port of the second reagent storage portion 2.

Embodiment 5

Next, Embodiment 5 of the present invention will be described.

Figure 9:
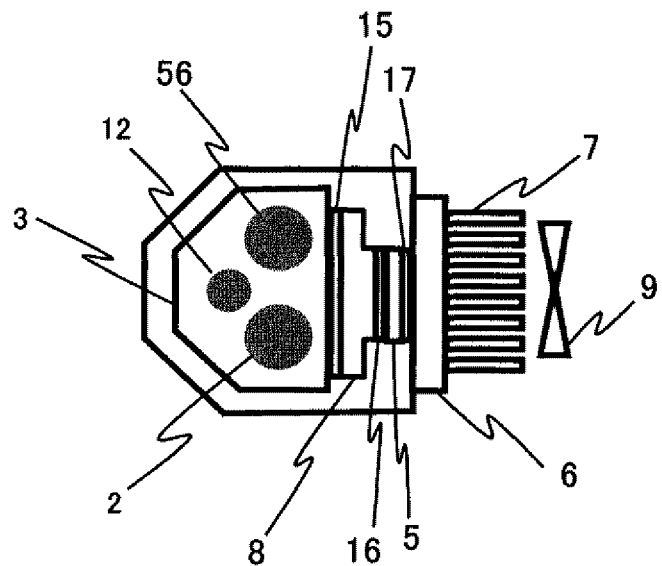
FIG. 9 is a top view illustrating a temperature adjusting unit according to Embodiment 5 of the present invention.
Figure 10:
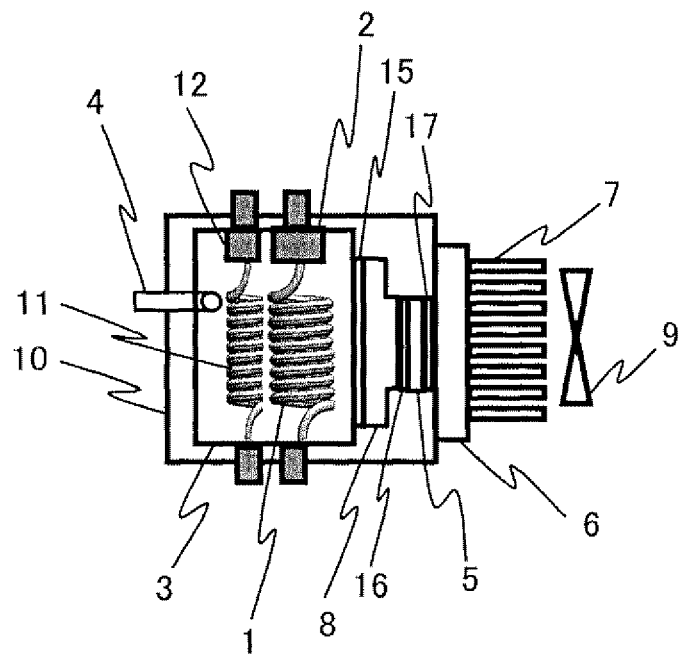
FIG. 10 is a schematic cross-sectional view illustrating Embodiment 5 of the present invention.

FIG. 9 is a top view illustrating a temperature adjusting unit 20 according to Embodiment 5 of the present invention. FIG. 10 is a schematic cross-sectional view illustrating Embodiment 5.

In FIGS. 9 and 10, components common with those in Embodiment 1 described above are denoted by the same reference signs. In addition, the configuration of the applied automatic immunoassay analyzer is similar to the example illustrated in FIG. 1, and thus illustrations and detailed description will be omitted. Note that, in FIG. 9, illustration of the temperature detector 4 is omitted in order to simplify the illustration.

In FIGS. 9 and 10, in Embodiment 5, the third reagent storage portion 11 and the fourth reagent storage portion 12 which have three systems of flow paths and are smaller in volume than other two reagent storage portions 1 and 55 are located farther from the Peltier element 5 than the other two reagent storage portions 2, 56. The three reagent storage portions of the second reagent storage portions 2 and 56 and the fourth reagent storage portion 12 are arranged to have a triangular shape. That is, the first reagent storage portion 1, the third reagent storage portion 11, and the fifth reagent storage portion 55 are arranged to be located at apexes of the triangle.

The first reagent storage portion 1, the second reagent storage portion 2, the third reagent storage portion 11, the fourth reagent storage portion 12, the fifth reagent storage portion 55, and the sixth reagent storage portion 56 are arranged described above, and thus it is possible to further reduce the volume of the temperature adjusting unit 20 in addition to obtaining of effects similar to those in Embodiment 1.

Note that, in Embodiment 5, although an example in which the sizes of the reagent storage portions 1 and 55 of two systems are equal to each other is described, all the reagent storage portions 1, 11, and 55 of three systems may have sizes (reagent storage volume) different from each other.

Further, in the example illustrated in FIG. 10, the temperature detector 4 is disposed near the reagent outlet port of the third reagent storage portion 11. The temperature detector 4 may be disposed between the reagent outlet port of the first reagent storage portion 1 and the reagent outlet port of the fifth reagent storage portion 56.

In addition, the first reagent storage portion 1, the second reagent storage portion 2, the third reagent storage portion 11, the fourth reagent storage portion 12, the fifth reagent storage portion 55, and the sixth reagent storage portion 56 in Embodiments 1, 2, and 3 can be arranged in a manner similar to that in Embodiment 5.

Hitherto, as described in detail above, according to the automatic immunoassay analyzer of the present invention, it is possible to reduce the volume and stably control the temperature of the reagent discharged from the temperature adjusting unit, in comparison to the conventional structure.

That is, according to the present invention, in the temperature adjusting unit 20 that preliminarily adjusts the temperature of the reagent, the reagent that intermittently flows by the syringe pumps (29, 30, and 31) firstly enters into the spiral pipe portion being the first reagent storage portion 1, and then is cooled. Then, the reagent in the first reagent storage portion 1 enters into the second reagent storage portion 2 when the syringe pumps (29, 30, and 31) operate. The reagent in the second reagent storage portion 2 is discharged to the reagent containers (22 and 23) through the tube 47. Since the second reagent storage portion 2 is configured by a thick and short pipe or the like, the volume per length is large. Thus, it is possible to reduce the size even with the same volume. In addition, since the heat capacity in the second reagent storage portion 2 is large, the temperature does not change easily by disturbance, and the temperature is always maintained to be constant. Therefore, it is possible to realize an automatic analyzer capable of more stabilizing the reagent temperature at the outlet port of the temperature adjusting unit while reducing the overall volume.

The above-described example is an example in which the present invention is applied to an automatic immunoassay analyzer, but the present invention is not limited to the automatic immunoassay analyzer. The present invention can be applied to other analyzers that require adjustment of reagent temperature, such as an electrolyte analyzer, for example.

Note that, although Embodiments 1 to 5 described above have been described on the assumption that a heat source is the Peltier element (heat source element), a device that cools the reagent storage portions 33 to 35 may be provided, the cooled reagent may be delivered to the temperature adjusting unit 20, and a heater may be used as the heat source 5.

Further, in the above-described embodiments, an example in which the temperature adjusting unit 20 includes the first reagent storage portion 1, the second reagent storage portion 2, the third reagent storage portion 11, the fourth reagent storage portion 12, the fifth reagent storage portion 55, and the sixth reagent storage portion 56 has been described. The present invention can be applied so long as the temperature adjusting unit 20 includes at least the first reagent storage portion 1 and the second reagent storage portion 2.

In addition, even in an example in which the temperature adjusting unit 20 includes the first reagent storage portion 1 and the second reagent storage portion 2, and the third reagent storage portion 11 and the fourth reagent storage portion 12, but does not include the fifth reagent storage portion 55 and the sixth reagent storage portion 56, the present invention can be applied.

REFERENCE SIGNS LIST 1 first reagent storage portion
2 second reagent storage portion
3 metal block
4, 19 temperature detector
5 Peltier element
6 fin base
7 fin
8 heat diffusion plate
9 fan
10 heat insulator
11 third reagent storage portion
12 fourth reagent storage portion
13a, 13b, 13c, 14a, 14b, 14c tube connector
15, 16, 17 thermal interface
18 hole
20 temperature adjusting unit
21 container holding member
22, 23 reagent container
24 sample container
25 reagent pre-treatment unit
29, 30, 31, 32 syringe pump
33, 34, 35 reagent storage portion
36, 37, 38, 39, 40, 41, 42, 43 valve
44 nozzle
45 holding portion
46 pipe
47 tube
48 detector
49 detector
50 waste liquid container
51, 52, 53, 54 plunger
55 fifth reagent storage portion
56 sixth reagent storage portion
60 controller
61 Peltier element controller
62 power output unit

The invention claimed is:
1. An automatic analyzer comprising:
an analyzing unit that analyzes a sample; and
a temperature adjusting unit that adjusts a temperature of a reagent required to analyze the sample in advance and supplies the reagent to the analyzing unit, wherein the temperature adjusting unit includes:
a first reagent storage portion that stores a reagent in a spiral-shaped pipe having a first reagent storage volume;
a second reagent storage portion that has a second reagent storage volume, is connected to the first reagent storage portion, supplied with a reagent from the first reagent storage portion, and is thicker and shorter than the first reagent storage portion; and
a Peltier element, wherein the Peltier element adjusts temperatures of the first reagent storage portion and the second reagent storage portion.

2. The automatic analyzer according to claim 1, wherein the temperature adjusting unit includes:
a third reagent storage portion that has a third reagent storage volume different from the first reagent storage volume and stores a reagent; and
a fourth reagent storage portion that has a fourth reagent storage volume different from the second reagent storage volume and is connected to the third reagent storage portion and to which a reagent is supplied from the third reagent storage portion.

3. The automatic analyzer according to claim 1, further comprising:
a delivery unit that intermittently delivers a reagent to the first reagent storage portion, wherein
the second reagent storage volume of the second reagent storage portion is greater than a discharge amount which is an amount a reagent that the delivery unit supplies to the first reagent storage portion once.

4. The automatic analyzer according to claim 1, further comprising:
a delivery unit that intermittently delivers a reagent to the first reagent storage portion, wherein
the first reagent storage volume of the first reagent storage portion is greater than a discharge amount which is an amount a reagent that the delivery unit supplies to the first reagent storage portion once.

5. The automatic analyzer according to claim 1, further comprising:
a delivery unit that intermittently delivers a reagent to the first reagent storage portion, wherein
the first reagent storage volume of the first reagent storage portion and the second reagent storage volume of the second reagent storage portion are greater than a discharge amount which is an amount a reagent that the delivery unit supplies to the first reagent storage portion once.

6. The automatic analyzer according to claim 1, wherein
the temperature adjusting unit includes a temperature detector that is disposed in the vicinity of a reagent outlet port of the first reagent storage portion, and
the temperature adjusting unit adjusts the temperature of the reagent such that a temperature detected by the temperature detector is a target temperature.

7. The automatic analyzer according to claim 1, wherein
the temperature adjusting unit includes a temperature detector that is disposed in the vicinity of the second reagent storage portion, and
the temperature adjusting unit adjusts the temperature of the reagent such that a temperature detected by the temperature detector is a target temperature.

8. The automatic analyzer according to claim 1, wherein
the temperature adjusting unit includes a first temperature detector and a second temperature detector,
the first temperature detector is disposed in the vicinity of a reagent outlet port of the first reagent storage portion,
the second temperature detector is disposed in the vicinity of the second reagent storage portion,
in a case where a rapid ambient temperature fluctuation occurs in the vicinity of the temperature adjuster, the temperature adjusting unit adjusts the temperature of the reagent such that a temperature detected by the second temperature detector is a target temperature, and
in a case where a rapid ambient temperature fluctuation does not occur in the vicinity of the temperature adjusting unit, the temperature adjusting unit adjusts the temperature of the reagent such that a temperature detected by the first temperature detector is a target temperature.

9. The automatic analyzer according to claim 1, wherein
the temperature adjusting unit includes a temperature detector that is disposed in the vicinity of the second reagent storage portion,
the second reagent storage portion is disposed at a position closer to the Peltier element than the first reagent storage portion, and
the temperature adjusting unit adjusts the temperature of the reagent so that a temperature detected by the temperature detector is a target temperature.

10. The automatic analyzer according to claim 1, wherein
the temperature adjusting unit includes
a third reagent storage portion that has a third reagent storage volume and stores a reagent,
a fourth reagent storage portion that has a fourth reagent storage volume and is connected to the third reagent storage portion and to which a reagent is supplied from the third reagent storage portion,
a fifth reagent storage portion that has a fifth reagent storage volume and stores a reagent, and
a sixth reagent storage portion that has a sixth reagent storage volume and is connected to the fifth reagent storage portion and to which a reagent is supplied from the fifth reagent storage portion, and
the first reagent storage portion, the third reagent storage portion, and the fifth reagent storage portion are disposed to be positioned at respective vertices of a triangle.

11. The automatic analyzer according to claim 10, wherein
the temperature adjusting unit includes a temperature detector that is disposed in the vicinity of a reagent outlet port of the first reagent storage portion, and
the temperature adjusting unit adjusts the temperature of the reagent such that a temperature detected by the temperature detector is a target temperature.

12. The automatic analyzer according to claim 10, wherein
the temperature adjusting unit includes a temperature detector that is disposed in the vicinity of the second reagent storage portion, and
the temperature adjusting unit adjusts the temperature of the reagent such that a temperature detected by the temperature detector is a target temperature.

13. The automatic analyzer according to claim 10, wherein
the temperature adjusting unit includes a first temperature detector and a second temperature adjusting unit,
the first temperature detector is disposed in the vicinity of a reagent outlet port of the first reagent storage portion,
the second temperature detector is disposed in the vicinity of the second reagent storage portion, in a case where a rapid ambient temperature fluctuation occurs in the vicinity of the temperature adjuster, the temperature adjusting unit adjusts the temperature of the reagent such that a temperature detected by the second temperature detector is a target temperature, and in a case where a rapid ambient temperature fluctuation does not occur in the vicinity of the temperature adjusting unit, the temperature adjusting unit adjusts the temperature of the reagent such that a temperature detected by the first temperature detector is a target temperature.

\* \* \* \* \*